United States Patent
Martin

(10) Patent No.: US 7,446,139 B2
(45) Date of Patent: Nov. 4, 2008

(54) MODIFIED ASPHALT BINDER MATERIAL USING CRUMB RUBBER AND METHODS OF MANUFACTURING A MODIFIED ASPHALT BINDER

(75) Inventor: Jean-Valery Martin, Hopewell, NJ (US)

(73) Assignee: Innophos, Inc., Cranbury, NJ (US)

( * ) Notice: Subject to any disclaimer, the term of this patent is extended or adjusted under 35 U.S.C. 154(b) by 0 days.

(21) Appl. No.: 11/415,516

(22) Filed: May 2, 2006

(65) Prior Publication Data

US 2006/0243163 A1 Nov. 2, 2006

Related U.S. Application Data

(60) Provisional application No. 60/677,040, filed on May 2, 2005.

(51) Int. Cl.
*C08L 95/00* (2006.01)
*C09D 195/00* (2006.01)

(52) U.S. Cl. .............................. 524/68; 524/60; 524/71

(58) Field of Classification Search .............. 106/273.1, 106/277, 281.1, 284.1; 524/60, 68, 71
See application file for complete search history.

(56) References Cited

U.S. PATENT DOCUMENTS

| 4,330,449 | A | * | 5/1982 | Maldonado et al. ........... 524/68 |
| 5,501,730 | A | * | 3/1996 | Duong et al. ............ 106/281.1 |
| 5,618,862 | A | | 4/1997 | Germanaud et al. |
| 5,710,196 | A | * | 1/1998 | Willard ....................... 524/68 |
| 5,880,185 | A | | 3/1999 | Planche et al. |
| 5,990,207 | A | | 11/1999 | Perret et al. |
| 6,011,095 | A | | 1/2000 | Planche et al. |
| 6,346,561 | B1 | * | 2/2002 | Osborn ........................ 524/59 |
| 6,706,787 | B1 | * | 3/2004 | Burris et al. .................. 524/60 |
| 6,818,687 | B2 | * | 11/2004 | Memon ....................... 524/68 |
| 7,074,846 | B2 | * | 7/2006 | Sylvester et al. .............. 524/71 |
| 2003/0018106 | A1 | * | 1/2003 | Sylvester ..................... 524/60 |
| 2006/0089429 | A1 | | 4/2006 | Buras et al. |
| 2006/0250886 | A1 | | 11/2006 | Dupuis et al. |
| 2007/0082983 | A1 | * | 4/2007 | Crews et al. .................. 524/60 |

FOREIGN PATENT DOCUMENTS

FR 2732702 10/1996

OTHER PUBLICATIONS

English Language Abstract of FR2732702.

* cited by examiner

*Primary Examiner*—David M Brunsman
(74) *Attorney, Agent, or Firm*—McCarter & English, LLP

(57) ABSTRACT

In a first aspect, bituminous asphalt binder materials which are modified by the addition of crumb rubber or ground tire rubber are described. In a second aspect, the present invention is directed to methods of producing a modified asphalt binder containing crumb rubber or ground tire rubber. The modified asphalt binders comprise neat asphalt, crumb rubber, one or more synthetic polymers, and one or more acids. The crumb rubber may be obtained from recycled truck and/or automobile tires.

11 Claims, No Drawings

MODIFIED ASPHALT BINDER MATERIAL USING CRUMB RUBBER AND METHODS OF MANUFACTURING A MODIFIED ASPHALT BINDER

CROSS-REFERENCE TO PRIORITY APPLICATION

This patent application claims priority under 35 U.S.C. § 119(e) to U.S. Provisional Patent Application No. 60/677,040 filed May 2, 2005, entitled "Modified Asphalt Binder Material Using Crumb Rubber And Methods Of Manufacturing A Modified Asphalt Binder", which is hereby expressly incorporated by reference in its entirety as part of the present disclosure.

FIELD OF THE INVENTION

The present invention is directed, in one aspect, to bituminous asphalt binder materials which are modified by the addition of crumb rubber or ground tire rubber. In a second aspect, the present invention is directed to methods of producing a modified asphalt binder containing crumb rubber or ground tire rubber. The modified asphalt binders of the present invention comprise neat asphalt, crumb rubber, one or more synthetic polymers, and one or more acids. The crumb rubber may be obtained from recycled truck and/or automobile tires.

The addition of crumb rubber in asphalt binders can improve the consistency and properties of the asphalt binders at high and low temperatures. In particular, the modified asphalt binders of the present invention exhibit improved elastic behavior, resulting in improved performance of roads or other surfaces paved using the modified asphalt binder. Road resistance to permanent deformation, fatigue cracking and thermal cracking is improved by use of the modified asphalt binder.

BACKGROUND

As used herein and in the claims, the phrase "asphalt binder" refers to a bituminous material, sometimes referred to as bitumen, used as a binder in asphalts used to pave roads or other surfaces or used in other construction materials such as roofing materials, coatings, and water sealants. Examples of bitumen that may be used in the compositions and methods of the present invention include natural bitumens, pyrobitumens and artificial bitumens. Bitumens that are particularly preferred are those used for roadways, such as asphalt or maltha. Asphalt paving material is made by mixing the asphalt binder with aggregate.

As used herein and in the claims, the phrase "crumb rubber" refers to rubber particles which have a particle size less than about 5 mm, and preferably have a particle size of less than about 2 mm. Crumb rubber may be obtained from grinding of used truck tires or automobile tires, or from any other appropriate source of ground rubber.

The use of crumb rubber and polyphosphoric acid in asphalt binders was described previously in publication number WO 04/081098, titled "Bituminous Binder and Method for the Production Thereof." As described in that published patent application, by combining between 0.5% by weight to 5% by weight polyphosphoric acid, and between 0.5% by weight to 25% by weight crumb rubber (or ground tire rubber) with the bituminous asphalt binder, the properties of the asphalt binder may be advantageously modified without increasing the rotational viscosity such that the mixing process requires high temperature conditions.

Asphalt binders are frequently used in applications where there can be a wide variation in environmental conditions, particularly when used in pavements. Accordingly, the properties of the asphalt binder in high and low temperature conditions is a concern. At low temperatures, some binder materials can become brittle, leading to long transverse fissures due to thermal stress. At higher temperatures, the asphalt binder becomes more fluid (i.e. the viscosity is lower), which can lead to rutting of a pavement due to the passage of vehicles over the surface. Resistance to fatigue and impact, and the adherence of the asphalt binder to aggregate in paving applications, are properties of a particular binder that also must be considered in particular applications.

Some asphalt binders may require a relatively high elastic behavior, for example where the corresponding asphalt paving mixture is used in areas of high traffic rates and high loads. Crumb rubber (or ground tire rubber), used alone or used in combination with polyphosphoric acid, does not sufficiently improve the elastic behavior of the asphalt paving mixture for high traffic and high load uses. When a high elasticity is required, large amounts of crumb rubber must be added to the asphalt binder. This can cause an undesirable increase in rotational viscosity, as well as problems related to storage of the binder material.

Accordingly, among the objects of the present invention is to provide an asphalt binder material with a relatively high elasticity, an acceptable rotational viscosity, and that can be stored for adequate periods of time. Another object of the present invention is to provide methods of making an asphalt binder having these properties.

SUMMARY OF THE INVENTION

In one aspect, the present invention is directed to a modified asphalt binder material comprising asphalt, crumb rubber, one or more synthetic polymers, and one or more acids. In one embodiment of the invention, neat asphalt is modified by adding 0.5% to 30% by weight of one or more synthetic polymers, 0.5% to 25% by weight of crumb rubber, and 0.05% to 5% of one or more acids. The asphalt binders of the present invention typically have between about 10% to about 90% elastic recovery under a standard elastic recovery test, such as the test protocols set forth in AASHTO T51, ASTM D6084-04, NLT329 or other standard tests.

In another aspect, the present invention is directed to methods of producing a modified asphalt binder material comprising asphalt, crumb rubber, one or more synthetic polymers, and one or more acids.

In yet another aspect, the modified asphalt binders of the present invention may be mixed with water and an emulsifier to form a emulsion. The emulsified asphalt binder may be mixed with an aggregate material, spread to form a layer of the desired thickness, and the emulsion will be broken to form an asphalt pavement. Alternatively, the emulsified asphalt binder may be spread upon a surface, an aggregate materials may be spread over the emulsified binder, and the emulsion may be broken.

DESCRIPTION OF PREFERRED EMBODIMENTS

The present invention is directed to modified asphalt binders and methods of making modified asphalt binders. The modified asphalt binders comprise neat asphalt, crumb rubber, one or more synthetic polymers, and one or more acids. It will be understood that "crumb rubber" as used herein includes crumb rubber, such as ground tire rubber or any other rubber provided in particle form suitable for mixture with an asphalt binder. Typically, a substantial portion of the crumb rubber will have a particle size less than about 5 mm, and preferably less than about 2 mm. The invention is not limited in this regard, and the crumb rubber may have any particle size distribution that results in an asphalt binder with the desired properties.

The modified asphalt binders of the present invention comprise between about 40% by weight to about 98.9% by weight neat asphalt, between about 0.5% by weight to about 30% by weight of one or more synthetic polymers, between about 0.5% by weight to about 25% by weight crumb rubber, and between about 0.05% by weight to about 5% by weight of one or more acids.

In a preferred embodiment, the modified asphalt binder is comprised of between about 82% by weight and 98.5% by weight neat asphalt, between about 0.5% by weight and about 5% by weight of one or more synthetic polymers, between about 0.5% by weight and 10% by weight crumb rubber, and from between about 0.5% by weight to about 3% by weight of one or more acids.

In a particularly preferred embodiment, the modified asphalt binder is comprised of between about 92% by weight and 95% by weight neat asphalt, between about 0.5% by weight and about 2% by weight of one or more synthetic polymers, between about 0.5% by weight and 5% by weight crumb rubber, and from between about 0.5% by weight to about 1% by weight of one or more acids.

Preferred synthetic polymers for use in the modified asphalt binder of the present invention include styrene butadiene, styrene butadiene styrene three block ("SBS"), ethylene vinyl acetate, ethylene propylene copolymers, polyvinylchorlide ("PVC"), nylon, polysterene, polybutadiene, acrylate resins, flurorocarbone resins, phenolic resins, alkyd resins, polyesters, polyethylene (linear or crosslinked), epoxy terpolymer, polypropylene, and combinations of the above polymers. The invention is not limited in this regard, and any appropriate synthetic polymer known to those skilled in the art may be used in the modified asphalt binder.

Preferred acids for use in the modified asphalt binder of the present invention include phosphoric acid, polyphosphoric acid (more than 100% expressed as orthophosphoric content) ("PPA"), sulfuric acid at more than 90% wt, boric acid and carboxylic acids such as, for example, adipic acid, citric acid, oxalic acid, tartaric acid, maleic acid, valeric acid, succinic acid, fumaric acid, glutamic acid, phtalic acid, acetic acid, and combinations of the above acids. The invention is not limited in this regard, and any appropriate acid known to those skilled in the art may be used in the modified asphalt binder.

The acid may be added to the asphalt binder in either a solid form or in a liquid form. Where a solid form of acid is used, the acid can be either the pure solid acid, such as boric acid or pyrophosphoric acid, or the acidic component may be combined with an inert component for ease of handling. For example, a combination of $Si_2$ In a second aspect, the present invention is directed to methods of producing the modified asphalt binder. Preferably, the method for manufacturing the modified asphalt binder comprises the steps of (1) heating the asphalt to a temperature of between about 120° C. and about 200° C., (2) adding a first modifying ingredient, (3) mixing the asphalt and the first modifying ingredient with a high shear mixture, such as, for example, a rotor-stator type mixer (i.e. a SILVERSON type mixer) for a period of between about 5 minutes and about 10 hours, (4) adding a second modifying ingredient to the modified asphalt binder, (5) mixing the second modifying ingredient and the modified asphalt binder in a high shear mixer for a period of between about 5 minutes and about 10 hours, (6) adding a third modifying ingredient to the modified binder material, (7) mixing the third modifying ingredient and the modified asphalt binder in a high shear mixer for a period of between about 5 minutes and about 10 hours, and (8) the third modified binder material is agitated in a low shear mixer (such as, for example, a propeller type mixer driven by a motor at about 250 rpm, similar to an IKA type lab mixer) for a period of between about 5 minutes and about 48 hours. Optionally, step (7) above may be omitted, and the third modifying ingredient may be mixed with the modified asphalt binder in a low shear mixer for a period of between about 5 minutes and about 48 hours.

The modifying ingredients used in the method are crumb rubber, one or more acids, or one or more synthetic polymers as described above. The crumb rubber, acid and synthetic polymer may be added in any order. Thus, the first modifying ingredient may be crumb rubber, the second modifying ingredient may be one or more acids and the third modifying ingredient may be one or more synthetic polymers. Alternatively, the first modifying ingredient may be crumb rubber, the second modifying ingredient may be one or more synthetic polymers and the third modifying ingredient may be one or more acids. Likewise, the first modifying ingredient may be one or more acids, the second modifying ingredient may be one or more synthetic polymers and the third modifying ingredient may be crumb rubber, or, alternatively, the first modifying ingredient may be one or more acids, the second modifying ingredient may be crumb rubber and the third modifying ingredient may be one or more synthetic polymers. Also, the first modifying ingredient may be one or more synthetic polymers, the second modifying ingredient may be one or more acids and the third modifying ingredient may be crumb rubber, or, alternatively, the first modifying ingredient may be one or more synthetic polymers, the second modifying ingredient may be crumb rubber and the third modifying ingredient may be one or more acids.

It will be understood by those skilled in the art that low shear mixers may be used in place of high shear mixers in the methods described above depending upon the temperatures and the mixing times used, and one skilled in the art can readily determine the appropriate mixing times based upon the temperature and the additive materials used. In a preferred embodiment, the asphalt binder is mixed for between 1 hour and 3 hours following addition of the crumb rubber, for between 15 minutes and 1 hour following addition of the acid, and for between 6 hours and 8 hours following addition of the polymer additive.

In the methods of the present invention, crumb rubber is added to the asphalt to achieve a crumb rubber level of between about 0.5% by weight and about 30% by weight in the final modified asphalt material. One or more acids are added to achieve a total acid concentration of between about 0.05% by weight and about 5% by weight in the modified asphalt material. One or more synthetic polymers are added to achieve a total polymer concentration of between about 0.5% by weight and about 30% by weight.

The preferred synthetic polymers and the preferred acids used in the methods of the present invention are described above.

Several exemplary embodiments of the methods of the present invention are described below:

EXAMPLE 1

Neat asphalt is heated to a temperature of between about 120° C. to about 200° C.
Add from between about 0.5% by weight to about 5% by weight of one or more synthetic polymer
Mix with high shear mixer for between about 5 minutes to about 10 hours
Add from between about 0.5% by weight to about 10% by weight of crumb rubber
Mix with a high shear mixer for between about 5 minutes to about 10 hours
Add from between about 0.5% by weight to about 3% by weight of one or more acids
Agitate the modified asphalt obtained with low shear mixer from 5 minutes to 48 hours

EXAMPLE 2

Neat asphalt is heated to a temperature of between about 120° C. to about 200° C.
Add from between about 0.5% by weight to about 5% by weight of one or more synthetic polymer
Mix with high shear mixer for between about 5 minutes to about 10 hours
Add from between about 0.5% by weight to about 3% by weight of one or more acids
Mix with a high shear mixer for between about 5 minutes to about 10 hours
Add from between about 0.5% by weight to about 10% by weight of crumb rubber
Mix with a high shear mixer for between about 5 minutes to 10 hours
Agitate the modified asphalt obtained with low shear mixer from 5 minutes to 48 hours

EXAMPLE 3

Neat asphalt is heated to a temperature of between about 120° C. to about 200° C.
Add from between about 0.5% by weight to about 10% by weight of crumb rubber
Mix with high shear mixer for between about 5 minutes to about 10 hours
Add from between about 0.5% by weight to about 5% by weight of one or more synthetic polymers
Mix with a high shear mixer for between about 5 minutes to about 10 hours
Add from between about 0.5% by weight to about 3% by weight of one or more acids
Agitate the modified asphalt obtained with low shear mixer from 5 minutes to 48 hours

EXAMPLE 4

Neat asphalt is heated to a temperature of between about 120° C. to about 200° C.
Add from between about 0.5% by weight to about 10% by weight of crumb rubber
Mix with high shear mixer for between about 5 minutes to about 10 hours
Add from between about 0.5% by weight to about 3% by weight of one or more acids
Mix with a high shear mixer for between about 5 minutes to about 10 hours
Add from between about 0.5% by weight to about 5% by weight of one or more synthetic polymers
Agitate the modified asphalt obtained with low shear mixer from 5 minutes to 48 hours

EXAMPLE 5

Neat asphalt is heated to a temperature of between about 120° C. to about 200° C.
Add from between about 0.5% by weight to about 3% by weight of one or more acids
Mix with high shear mixer for between about 5 minutes to about 10 hours
Add from between about 0.5% by weight to about 5% by weight of one or more synthetic polymers
Mix with a high shear mixer for between about 5 minutes to about 10 hours
Add from between about 0.5% by weight to about 10% by weight of crumb rubber
Mix with a high shear mixer for between about 5 minutes to about 10 hours
Agitate the modified asphalt obtained with low shear mixer from 5 minutes to 48 hours

EXAMPLE 6

Neat asphalt is heated to a temperature of between about 120° C. to about 200° C.
Add from between about 0.5% by weight to about 3% by weight of one or more acids
Mix with high shear mixer for between about 5 minutes to about 10 hours
Add from between about 0.5% by weight to about 10% by weight of crumb rubber
Mix with a high shear mixer for between about 5 minutes to about 10 hours
Add from between about 0.5% by weight to about 5% by weight of one or more synthetic polymers
Mix with a high shear mixer for between about 5 minutes and about 10 hours
Agitate the modified asphalt obtained with low shear mixer from 5 minutes to 48 hours In tests carries out on actual mixtures of various embodiments of the present invention, the modified asphalt binder has been shown to have desirable properties for use as an asphalt binder material. In each of the tests described below, the modified asphalt binder was stirred at 160° C. as follows: (1) following addition of crumb rubber, the modified asphalt binder was stirred for about 2 hours using a high shear mixer; (2) following addition of PPA, the modified asphalt binder was stirred for about 0.5 hours using a low shear mixer; and (3) following addition of SBS polymer, the modified asphalt was mixed for about 7 hours using a high shear mixer.

In one series of tests carried out using Asphalt PG64-22 as the base material, SBS as the polymer and PPA as the acid, the asphalt modifying agents were added in the following order: crumb rubber first, SBS second and PPA third. The resulting asphalt binder had the following properties:

TABLE 1

| | CR-SBS-PPA | | |
| --- | --- | --- | --- |
| % CR | 5 | 5 | 5 |
| % PPA | 0.5 | 0.5 | 0.5 |
| % SBS | 0.5 | 1.0 | 2.0 |
| Asphalt | Asphalt 64-22 | Asphalt 64-22 | Asphalt 64-22 |
| Temperature | 160° C. | 160° C. | 160° C. |
| Visc, cP, 135° C. | 1180 | 1400 | 1930 |
| ER, %, 25° C. | 50 | 50 | 75 |

TABLE 1-continued

| CR-SBS-PPA | | | |
|---|---|---|---|
| Separation, °C. | 8.5 | 1.8 | 7 |
| Top end tru-grade | 73.5 | 74.4 | 76.3 |
| BBR, Stiffness, MPa | 147 | 143 | 152 |
| BBR, m-value | 0.336 | 0.329 | 0.319 |

In another series of tests carried out using Asphalt PG64-22 as the base material, SBS as the polymer and PPA as the acid, the asphalt modifying agents were added in the following order: SBS first, PPA second and crumb rubber third.

TABLE 2

| SBS-PPA-CR | | | |
|---|---|---|---|
| % CR | 5 | 5 | 5 |
| % PPA | 0.5 | 0.5 | 0.5 |
| % SBS | 0.5 | 1.0 | 2.0 |
| Asphalt | Asphalt 64-22 | Asphalt 64-22 | Asphalt 64-22 |
| Temperature | 160° C. | 160° C. | 160° C. |
| Visc, cP 135° C. | 1040 | 1210 | 1720 |
| ER, %, 25° C. | 45 | 47.5 | 60 |
| Separation, °C. | 7.3 | 0 | 14 |
| Top end tru-grade, C | 73.9 | 74.3 | 76.1 |
| BBR, Stiffness, MPa | 146 | 152 | 161 |
| BBR, m-value | 0.328 | 0.331 | 0.312 |

In another series of tests carried out using Asphalt PG64-22 as the base material, SBS as the polymer and PPA as the acid, the asphalt modifying agents were added in the following order: SBS first, crumb rubber second and PPA third.

TABLE 3

| SBS-CR-PPA | | |
|---|---|---|
| % CR | 5 | 5 |
| % PPA | 0.5 | 0.5 |
| % SBS | 0.5 | 2.0 |
| Asphalt | Asphalt 64-22 | Asphalt 64-22 |
| Temperature | 160° C. | 160° C. |
| Visc, cP, 135° C. | 1110 | 1840 |
| ER, %, 25° C. | 45 | 70 |
| Separation, °C. | 7 | 2.7 |
| Top end tru-grade | 74.3 | 77.4 |
| BBR, Stiffness, MPa | 151 | 162 |
| BBR, m-value | 0.325 | 0.307 |

The tests listed in the Tables above were performed in accordance with the following methods:

AASHTO M320

Includes following AASHTO methods:

| | |
|---|---|
| T316 | Brookfield Viscosity |
| T315 | DSR |
| T240 | RTFO |
| R28 | PAV |
| T313 | BBR |
| T301 | Elastic Recovery (Modified: 25 C, 10 cm, cut immediately) |
| T53 | Softening Point |

The modified asphalt composition may be used in an emulsion type process to apply the asphalt binder material. In one embodiment, the emulsion process comprises the following steps:

1.—the modified asphalt composition is prepared as described above;

2.—an emulsion of the modified asphalt composition obtained in step 1 is prepared by mixing water, the modified asphalt composition and an emulsifier at ambient temperature;

3.—the emulsion obtained in step 2 is spread in order to obtain a uniform layer of the emulsified asphalt binder; and 4.—the emulsion is broken.

Prior to breaking the emulsion, an aggregate material may be spread on the emulsified asphalt binder. Alternatively, the process described above may include an additional step in which aggregate is added, with stirring and at ambient temperature, to the emulsion obtained in step 2 of the process to form an asphalt pavement material. The asphalt pavement material is spread to the desired thickness and the emulsion is broken. The emulsifier may be any appropriate emulsifier known to those skilled in the art. Also, the emulsion may be broken using conventional methods for breaking asphalt emulsions.

It will be recognized by those skilled in the art that the compositions or methods described above may be altered in numerous ways without departing from the scope of the present invention. For example, one or more of the mixing steps described above may be omitted, two or more of the modifying ingredients may be added to the asphalt together or at the same time, or additional modifying agents may be added to the composition to further modify the properties of the composition. Accordingly, the preferred embodiments described herein are intended to be illustrative rather than limiting in nature.

I claim:

1. A method for making a modified asphalt binder composition, comprising the steps of:
   a. providing neat asphalt in an appropriate vessel;
   b. heating the neat asphalt to a temperature of between about 120° C. and about 200° C.;
   c. adding to the neat asphalt a first modifying ingredient selected from the group consisting of at least one acid, at least one synthetic polymer and crumb rubber;
   d. mixing the asphalt and the first modifying ingredient with one of a high shear mixer or a low shear mixer for a period of between about 5 minutes and about 10 hours
   e. adding to the modified asphalt binder a second modifying ingredient selected from the group consisting of at least one acid, at least one synthetic polymer and crumb rubber, wherein the second modifying ingredient is a different type of ingredient than the first modifying ingredient;
   f. mixing the second modifying ingredient and the modified asphalt binder in one of a high shear mixer or a low shear mixer for a period of between about 5 minutes and about 10 hours
   g. adding to the modified asphalt binder a third modifying ingredient selected from the group consisting of at least one acid, at least one synthetic polymer and crumb rubber, wherein the third modifying ingredient is a different type of ingredient than the first modifying ingredient and the second modifying ingredient; and
   h. agitating the third modifying ingredient and the modified binder material in one of a low shear mixer or a high shear mixer for a period of between about 5 minutes and about 48 hours.

2. The method of claim 1, wherein the step of agitating the third modifying ingredient and the modified binder material is performed in a low shear mixer for a period of between 5 minutes and 10 hours.

3. The method of claim 1, wherein the first modifying ingredient is between about 0.05% by weight and about 5% by weight of at least one acid, the second modifying ingredient is between about 0.5% by weight and about 30% by weight of at least one synthetic polymer, and the third modifying ingredient is between about 0.5% by weight and about 25% by weight crumb rubber.

4. The method of claim 1, wherein the first modifying ingredient is between about 0.05% by weight and about 5% by weight of at least one acid, the second modifying ingredient is between about 0.5% by weight and about 25% by weight of crumb rubber, and the third modifying ingredient is between about 0.5% by weight and about 30% by weight of at least one synthetic polymer.

5. The method of claim 1, wherein the first modifying ingredient is between about 0.5% by weight and about 30% by weight of at least one synthetic polymer, the second modifying ingredient is between about 0.05% by weight and about 5% by weight of at least one acid, and the third modifying ingredient is between about 0.5% by weight and about 25% by weight crumb rubber.

6. The method of claim 5, wherein the first modifying ingredient is between about 0.5% by weight and about 2% by weight of styrene butadiene styrene, the second modifying ingredient is between about 0.1% by weight and about 1% by weight of polyphosphoric acid, and the third modifying ingredient is between about 4% by weight and about 6% by weight crumb rubber.

7. The method of claim 1, wherein the first modifying ingredient is between about 0.5% by weight and about 30% by weight of at least one synthetic polymer, the second modifying ingredient is between about 0.5% by weight and about 25% by weight of crumb rubber, and the third modifying ingredient is between about 0.05% by weight and about 5% by weight of at least one acid.

8. The method of claim 7, wherein the first modifying ingredient is between about 0.5% by weight and about 2% by weight of styrene butadiene styrene, the second modifying ingredient is between about 4% by weight and about 6% by weight of crumb rubber, and the third modifying ingredient is between about 0.1% by weight and about 1% by weight of polyphosphoric acid.

9. The method of claim 1, wherein the first modifying agent is between about 0.5% by weight and about 25% by weight of crumb rubber, the second modifying agent is between about 0.5% by weight and about 30% by weight of at least one synthetic polymer, and the third modifying agent is between about 0.05% by weight and about 5% by weight of at least one acid.

10. The method of claim 9, wherein the first modifying agent is between about 4% by weight and about 6% by weight of crumb rubber, the second modifying agent is between about 0.5% by weight and about 2% by weight of styrene butadiene styrene, and the third modifying agent is between about 0.3% by weight and about 1% by weight of polyphosphoric acid.

11. The method of claim 1, wherein the first modifying agent is between about 0.5% by weight and about 25% by weight of crumb rubber, the second modifying agent is between about 0.05% by weight and about 5% by weight of at least one acid, and the third modifying agent is between about 0.5% by weight and about 30% by weight of at least one synthetic polymer.

* * * * *